United States Patent [19]
Meta

[11] 4,421,098
[45] Dec. 20, 1983

[54] MULTIFUNCTION SOLAR WINDOW AND VENETIAN BLIND

[76] Inventor: Frank Meta, 147 Haper Ave., Irvington, N.J. 07111

[21] Appl. No.: 273,635

[22] Filed: Jun. 15, 1981

[51] Int. Cl.³ .............................................. F24J 3/02
[52] U.S. Cl. ...................................... 126/429; 126/424
[58] Field of Search ............... 126/424, 425, 438, 429, 126/430, 431, 450, 400; 165/485; 353/3

[56] References Cited

U.S. PATENT DOCUMENTS

| | | | |
|---|---|---|---|
| 3,981,445 | 9/1976 | Custer | 126/429 |
| 4,090,497 | 5/1978 | Kelly | 165/485 |
| 4,091,863 | 5/1978 | Schroder | 126/400 |
| 4,232,731 | 11/1980 | Kaplow et al. | 165/485 |
| 4,296,734 | 10/1981 | Nevins | 126/429 |
| 4,369,766 | 1/1983 | Coley | 126/429 |

FOREIGN PATENT DOCUMENTS 574545 3/1958 Italy .................... 126/429

*Primary Examiner*—James C. Yeung
*Attorney, Agent, or Firm*—Carella, Byrne, Bain & Gilfillan

[57] ABSTRACT

A multifunction solar window and venetian blind is disclosed which is both functional and decorative. The disclosed structure includes a combination of a double-glazed window or door provided with a plurality of solar thermal energy absorbing slats rotatably installed intermediate the glass panes of said window. The slats have at least one surface constructed for absorbing solar thermal energy, and may be rotated to face either surface toward the exterior of dwelling in which the window may be installed. A plurality of apertures through the frame above and below the glass surfaces may be selectively opened and closed, in desired combinations, to provide open pathways through which air may flow into and out of the space between the glass surfaces. The slats in this space may transfer their heat to this air which may, by selective opening of said apertures, be used to heat or ventilate the interior of the dwelling. Decorative strips are provided on the slats to enhance solar efficiency and to provide a plurality of decorative patterns.

7 Claims, 14 Drawing Figures

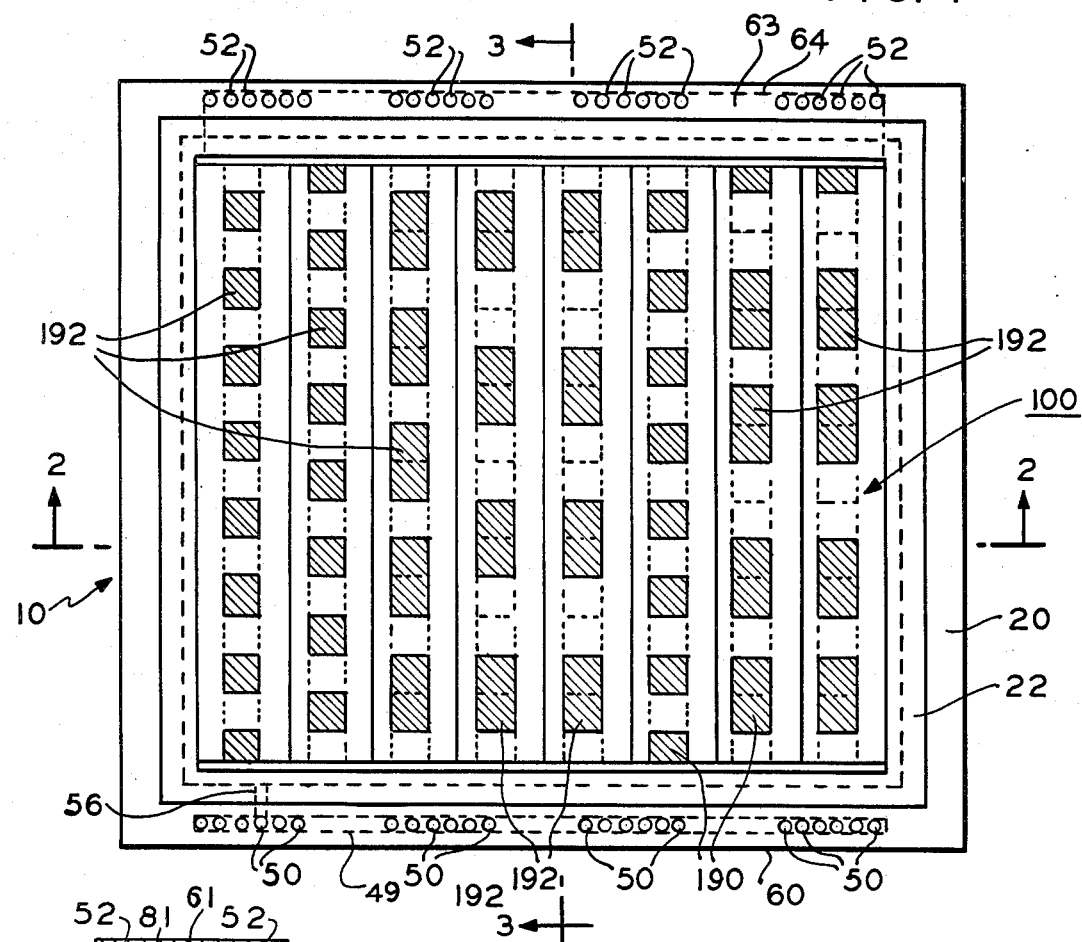
FIG. 1
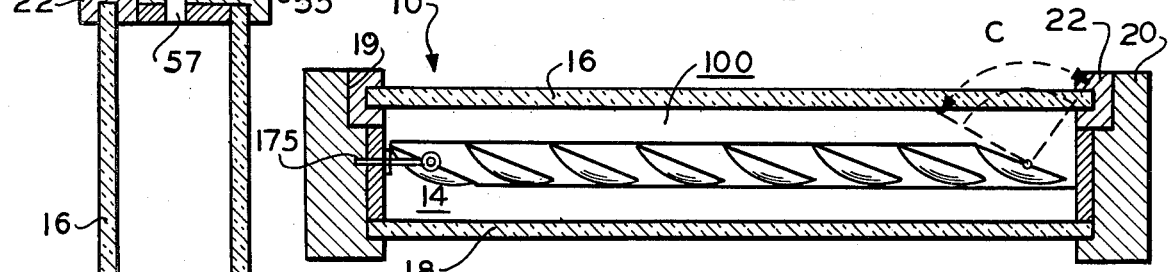
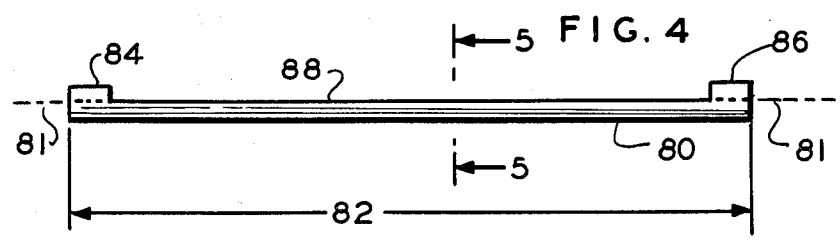
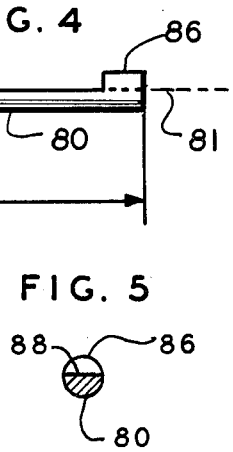
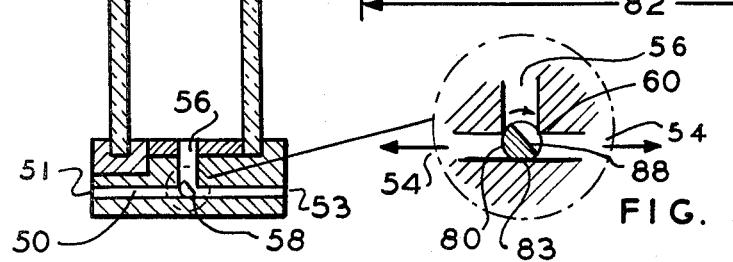

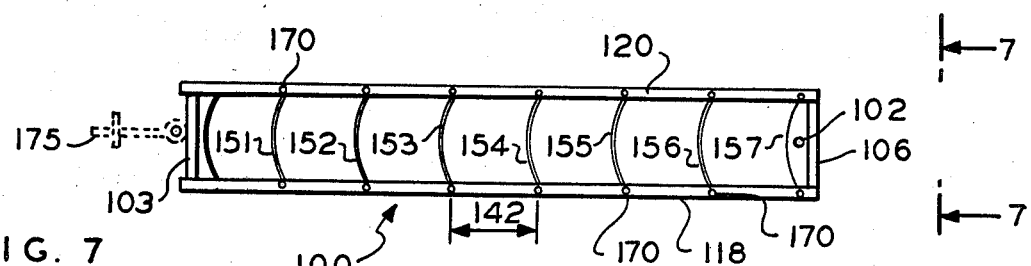
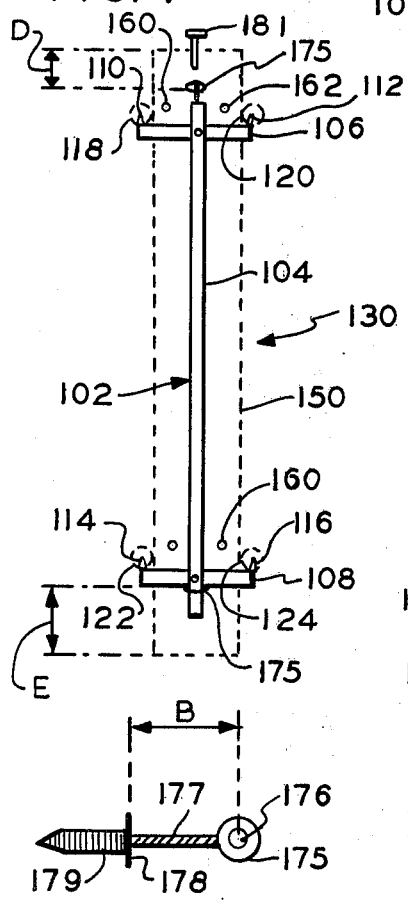
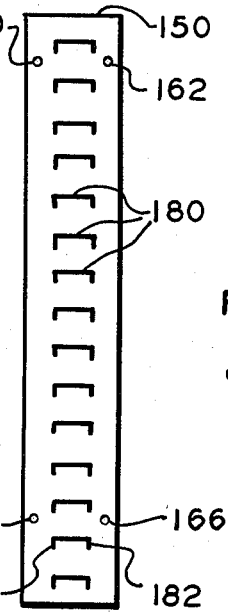
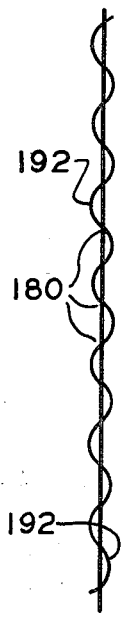
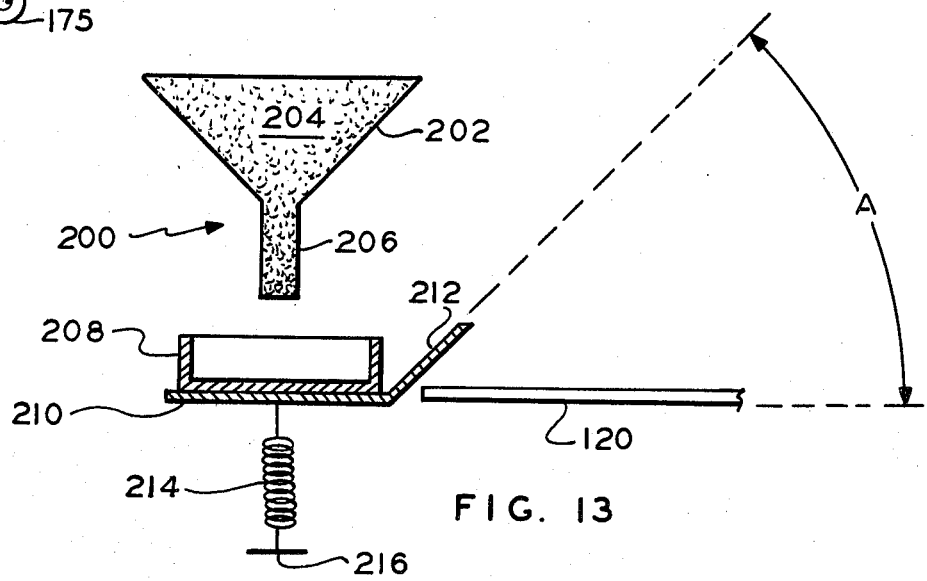

MULTIFUNCTION SOLAR WINDOW AND VENETIAN BLIND

BACKGROUND OF THE INVENTION

1. Field of the Invention

This invention relates generally to solar heating apparatus and, in particular, to windows provided with apparatus for utilizing solar energy to heat and ventilate the interior of a dwelling.

2. Description of the Prior Art

Windows constructed in combination with devices for utilizing solar energy are known in the prior art. Generally, such windows include means for absorbing solar energy from the exterior of the dwelling and radiating heat into the interior. These absorbing and radiating means have been known in the prior art to comprise, for example, rotatable panels as shown in U.S. Pat. No. 3,012,294, issued Dec. 12, 1961, or venetian-type blinds as shown in U.S. Pat. No. 4,002,159, issued Jan. 11, 1977.

A disadvantage of prior art solar windows and venetian blinds is that they do not have the capability of ventilating the interior of the dwelling with outside fresh air without destroying the solar heating function of the window.

Furthermore, prior art solar windows and venetian blinds are not known to provide window decorations while simultaneously serving a solar-efficiency function. While venetian blinds have been known to incorporate decorations on the panels or slats of the blinds as shown in U.S. Pat. No. 2,074,482, issued Mar. 23, 1937, such prior art decorative means are obviously very limited in the number of decorative designs which can be shown in any one venetian blind. Once the slats of prior art venetian blinds are imprinted with a particular design or pattern, it is not possible to change that design or pattern without installing another venetian blind having its own unique pattern. Thus, if a user should desire to decorate his or her dwelling with a new pattern or color of venetian blind to match, for example, newly painted walls, etc., this would entail costly replacement of the entire venetian blind. Another feature of prior art venetian blinds is that the patterns or decorative means thereof do not serve any functional purpose. It is an object of this invention to provide a solar window having the capability of providing heat to the interior of a dwelling while also having the capability of ventilating said interior.

Another object of this invention is to provide a solar window having the capability of being arranged in a plurality of selectable and changeable decorative patterns.

Yet another object of this invention is to provide a solar window having functional decorative means to enhance the solar efficiency of said window.

Still another object of this invention is to provide a solar window capable of inexpensive, efficient and silent production of solar heat energy.

SUMMARY OF THE INVENTION

These and other objects of the present invention are achieved by the preferred embodiment thereof which is disclosed herein and comprises a multifunction solar window and venetian blind for accomplishing numerous tasks. The invention further comprises a box frame glazed on two opposing surfaces, a plurality of heat absorbing slats rotatably installed intermediate and parallel to said glass surfaces, and a plurality of heating and ventilation apertures in said frame to permit circulation of air within the multifunction window. Said apertures go through said frame from the interior to the exterior of the dwelling and are provided with valves for selectively opening and closing various ones of said apertures. Said slats are further provided with transverse slits through which decorative and functional strips are interwoven. These strips enhance the heat transfer capability of the slats which, upon being heated by having their heat-absorbing surfaces exposed to solar radiation, transfer this heat to the ambient air within the window. By opening and closing selective ones of said apertures this heated air can be used to heat or ventilate the interior of the dwelling.

BRIEF DESCRIPTION OF THE DRAWINGS

A better understanding of the present invention as well as additional objects and advantages thereof will become apparent upon consideration of the detailed disclosure thereof which follows, in conjunction with the following drawings, wherein:

FIG. 1 is a front elevational view, partly in cross-section, of the preferred embodiment of the invention;

FIG. 2 is a side elevational view of FIG. 1 taken along the lines 2—2;

FIG. 3 is a side elevational view of FIG. 1 taken along the lines 3—3;

FIG. 3A is an enlarged view of a portion of FIG. 3;

FIG. 4 is a side elevational view of a valve utilized in the preferred embodiment;

FIG. 5 is a cross-sectional view of FIG. 4 taken along the lines 5—5;

FIG. 6 is a front elevational view of one of the slat racks of the preferred embodiment;

FIG. 7 is a plan view of the slat racks and rack rods of the preferred embodiment;

FIG. 8 is a plan view of one of the slats of the preferred embodiment;

FIG. 9 is a side elevational view of the slats of FIG. 8;

FIG. 10 is a plan view of a decorative strip for use with the slat of FIG. 8;

FIG. 11 is a schematic, side elevational view of a decorative strip interwoven with a slat;

FIG. 12 is a schematic view of an eye bracket used with the invention.

FIG. 13 is a schematic view of a part of the invention for synchronously rotating the slats.

DESCRIPTION OF THE PREFERRED EMBODIMENT

Referring now to FIG. 1 there is shown a front elevational view, partly in cross-section, of the preferred embodiment of the invention, generally designated as window unit 10. FIG. 2 is a side elevational view of cross-section of unit 10 taken along the lines 2—2 of FIG. 1. Window unit 10 comprises a double glazed window having an inner or intermediate space 14 between glass panes 16 and 18. In the preferred embodiment window 10 is constructed of a four-sided box or frame 20 into which glass pane 18 is imbedded and sealed in a conventional manner. Glass pane 16, on the other hand, is received within auxiliary frame 22 which is a four-sided frame shaped for air-tight engagement within a channel 19 formed in frame 20 as best seen in FIG. 2 and FIG. 3. Frame 22 is constructed and fitted so as to be selectively removable (for example, by means of hinges or other conventional means not shown) in order to provide access to the interior space 14 between glass panes 16 and 18. Because glass pane 16 is intended to be selectively removable, the window unit 10 is used in practice by being installed in an exterior wall with pane 16 facing the interior of the dwelling.

Window unit 10 is further provided with a plurality of throughbores 50 disposed transversely through the bottom of frame 20 and a plurality of throughbores 52 disposed transversely through the top of frame 20. Each of the bores 50 and 52 extends through frame 20 as best seen in FIG. 3. Bores 50 and 52 are shown as having a circular cross-section, however, the bores may be formed having any cross-sectional configuration, e.g. the thin rectangular aperture as shown in phantom at 51 in FIG. 1.

Throughbore 50 is open at one end 51 to the interior of a structure to be served and at its other end 53 to the exterior of the structure to be served. Similarly, throughbore 52 is open at one end 54 to the interior of the structure to be served and at its other end 55 to the exterior of the structure to be served.

Formed generally centrally of the bottom portion of frame 20 is a vertically extending bore 56 which extends between throughbore 50 and interior space 14. Similarly, formed generally centrally of the top portion of frame 20 is a vertically extending bore 57 which extends between throughbore 52 and interior space 14.

In this regard it should be noted that the embodiment of FIGS. 1-3 there are shown a plurality of throughbores 50, 52 and bores 56, 57. It will be recognized by those skilled in these arts, however, that the plural throughbores may be replaced by suitably disposed slots or the like.

Also formed generally centrally of the bottom portion of frame 20 is a transversely extending bore 60. Bore 60 extends throughout the entire width of window 10 but is plugged at its ends to have an effective length equal to the distance between the left-most and right-most bores 50.

Similarly, formed generally centrally of the top portion of frame 20 is a transversely extending bore 61. Bore 61 also extends throughout the entire width of window 10 but is plugged at its ends to have an effective length equal to the distance between the left-most and right-most bores 52.

Bores 60 and 61 define mounting spaces for valve means 80 and 81, respectively. Valve means 80 and 81 are longitudinally extending rods which are relieved chordally on one side as best may be seen in FIG. 3A with respect to valve 80. The degree of relief of rods 80 and 81 is selected such that rotation of the rods permits any of three directions of flow. Considering this function in the context of valve 80 in FIG. 3A, the valve may be positioned as shown to permit fluid communication between space 14 and the exterior of window 10, or the valve may be rotated to permit fluid communication between space 14 and the interior of window 10, or the valve may be rotated to permit direct communication between the interior and exterior of window 10. Valve means 80, 81 may be operated by pushrod, simple gear or any other known operating means (not shown) which will be well known to those skilled in the arts.

Received within frame 20 in space 14 is a solar slat assembly designated generally by the reference numeral 100. Referring therefore to FIGS. 6-11, FIG. 6 shows an end elevational view of solar slat assembly 100 in an open position (while FIGS. 1 and 2 show solar slat assembly 100 in a closed position). Solar slat assembly 100 includes two racks 102 and 103, best seen in FIG. 7 which is a side elevational view of FIG. 6 taken along the lines 7—7. Rack 102 is identical to rack 103 and therefore only one such rack will be more fully described herein. Rack 102 comprises a vertical tube 104, two crossbars 106 and 108 secured thereto, and pegs 110, 112, 114 and 116 secured to the ends of the crossbars as shown in FIG. 7.

Pivotally mounted between racks 102 and 103 are a plurality of rack rods 118, 120, 122 and 124. Rod 118 is secured between pegs 110, rod 120 is secured between pegs 112, rod 122 is secured between pegs 114 and, similarly, rod 124 is secured between pegs 116.

Racks 102 and 103 and rods 118, 120, 122 and 124 comprise a frame 130 upon which a plurality of venetian-type slats 150–157, best seen in FIGS. 8 and 9, are mounted spaced apart in parallel orientation. Each slat may be made of any desired material such that it has good heat absorption and transfer characteristics on at least one side. Slats 150–157 are pivotably secured to and between rods 118, 120, 122 and 124, as shown in phantom in FIG. 7, in a parallel orientation as best seen in FIG. 6. Each of the slats 150–157 is provided with apertures 160, 162, 164 and 166, as best seen in FIG. 8, and each of rods 118, 120, 122 and 124 is provided with corresponding apertures 170 (since all slats are identical only one slat 150 is shown therein and discussed below). Each of the apertures 160, 162, 164 and 166 is situated on slat 150 so that when slat 150 is placed in proper (parallel, spaced apart) position between the rods, as shown in FIGS. 6 and 7, apertures 160, 162, 164 and 166 will be adjacent corresponding apertures 170 in rods 118, 120, 122 and 124 respectively. In the preferred embodiment, small pieces of wire (not shown) are threaded between adjacent corresponding apertures on slats 150–157 and rods 118, 120, 122 and 124 in order to secure the slats to the rods while enabling pivotal motion therebetween.

It can thus be seen that frame 130 may be reoriented by rotating crossbars 106, 108 about tubes 104 thereby displacing rack rods 118 and 122 in opposite direction to rack rods 120 and 124. The crossbars and rack rods therefore cooperate to define a parallelogram of varying shapes, e.g. from the rectangle shown in FIG. 8 to the shape shown in FIG. 2. As will be recognized by those skilled in these arts, the purpose of such reorientation is to change the angular position of the slats.

Solar assembly 100 is installed in space 14 by rotatable engagement of the top and bottom ends of racks 102 and 103 with eye brackets 175, one of which is shown in FIG. 12. Eye bracket 175 includes an aperture portion 176 (having an inside diameter slightly greater than the outside diameter of tubes 104 of rack 102 or 103), a neck 177, a shoulder 178 and a nail end 179. Eye bracket 175 is, in operation, imbedded into frame 20 as shown on the left side of FIG. 2 (one eye bracket 175 is associated with each of the upper and lower ends of racks 102 and 103, however, only one bracket is shown in FIGS. 2 and 6 for clarity). Each aperture 176 is situated a predetermined distance B from shoulder 178 which, in operation, abuts the inside surface of frame 20, thus maintaining racks 102 and 103 in a fixed, predetermined and rotatable position (rotatable through angle C as shown in FIG. 2) relative to frame 20 and space 14. Eye brackets 175 are placed within space 14, and apertures 176 are of such size, as to enable solar assembly 100 to be installed and removed at will. As seen in FIG. 7, a pair of top and bottom eye brackets (the apertures of which are shown partly in perspective for clarity) are spaced from the top and bottom of space 14 by predetermined distances D and E, respectively. Further, when assembled, upper crossbar 106 is under upper eye bracket 175, and lower crossbar 108 rests on lower eye bracket 175. Pin 181 is placed into upper eye bracket 175 and into the top of tubes 104 of racks 102 and 103.

Such installation enables rotation of racks 102 and 103 which, for example, in the extreme counterclockwise position (not shown) will close the slats and expose one side of all slats to the exterior, and in the extreme clockwise position (not shown) will close the slats and expose the other side of said slats to the exterior, and in an intermediate position will open the slats. The rotations of racks 102 and 103, and the consequent re-positioning of the slats, may be accomplished either manually by opening frame 22 to gain access to space 14, or by automatic and conventional means (not shown) accessible from without space 14.

Each slat 150 is curved, as best seen in FIG. 9 to provide desired rigidity and is also provided with a plurality of transverse slits 180 for receiving a decorative strip 190, best seen in FIG. 10 (each slat is provided with such a strip 190). Strips 190 may be provided with any desired pattern, such as for example pattern 191, and may be manufactured of any desired material and in any color. In the preferred embodiment disclosed herein, strips 190 are a fraction of thickness of slat 150 and are preferably made of any metallic material having good heat transfer characteristics.

FIG. 11 depicts in exaggerated, diagrammatic form how strip 190 may be threaded among slits 180 to produce air gaps 192 between the slat surfaces and the surfaces of strips 190. By reference to the various strips 190 shown in FIG. 1 it is shown that many different decorative designs may be produced by altering the manner in which strips 190 are threaded through slits 180. That is, strip 190 may be threaded among adjacent slits or through slits separated by any desired number of empty slits (i.e. those slits not having a strip threaded therethrough). Furthermore, any one slat may, if desired, have more than one strip 190 threaded therethrough and the strips may have any number of patterns 191.

Each transverse slit 180 is provided with longitudinally aligned cuts 182 and 184 at each end of the slit. These cuts facilitate threading of the strips 190 through te slits 180 and also facilitate formation of air gaps 192 by frictionally and tensionally holding strip 190 in a desired position.

Air gaps 192 may be extremely small and functionally nonexistent if it is desired to thread strips 190 tightly so that strip 190 will be almost parallel to slot 150. Alternatively strips 190 may be threaded loosely so as to increase the size of air gap 192. In such cases it will be recognized that strip 190, because of the shape of its tortuous path will be longer thereby exposing more material to solar energy. As the slats and strips become heated by solar energy they transfer this heat to the air in space 14. Thus, variation of the degree of curve of strips 190 will vary the amount of surface area available for heat transfer between the slat and strip material and the air within space 14. Further, the greater the curve of strips 190 the more the interference with the flow of air through space 14. Such interference causes a slight turbulance which increases the heat transfer efficiency of the assembly.

In actual operation, the multifunction solar window and venetian blind may be used to accomplish several tasks by the selective predetermined arrangements of the several component parts of the invention disclosed herein.

For example, the invention may be used to heat the interior of a dwelling by circulating either inside air or outside air. To heat the interior with inside air, it is necessary to turn valves 80 and 81 in both top and bottom channels 60 and 61 so as to communicate space 14 with openings 51 and 54 at the interior of the dwelling and to position the slats with the heat absorbing surface thereof facing the exterior. As solar energy heats the slats, the heat therein will transfer to the ambient air around the slats thereby causing the air to rise and create circulation within space 14 thereby causing interior colder air to be drawn through opening 51 into the bottom bore 50 and heated in space 14 and forced out through the top bore 52 and opening 54. Thus, heated air will be circulated into the interior from the top channels.

To heat the interior using outside, fresh air it is necessary to turn valve 80 such as to communicate space 14 with the outside through opening 53 and bore 50. Top valve 81 is retained in position for communicating space 14 with the dwelling interior through opening 54 and bore 52. The slats are positioned with the heat absorbing surface facing the exterior. The ambient air within space 14 will again become heated creating upward circulation therein and forcing the heated air into the interior through the top inside opening 54 and drawing colder air from the outside through the bottom opening 53 and through bores 50 and 56 into space 14.

To utilize the invention for exhaust ventilation purposes, it is necessary to turn valve 80 to communicate space 14 with the dwelling interior through opening 51 and bores 50 and 56, and to position valve 81 to communicate space 14 with the exterior through bores 57 and 52 and opening 55. The slats are oriented with their heat absorbing surface facing the exterior. The heated air within space 14 will again cause upward circulation drawing air from the interior through the bottom inside opening 51 and heating it in space 14 and forcing it out through the top exterior opening 55.

To utilize the invention for insulation purposes, all bore may be closed by positioning valves 80 and 81 accordingly and thereby creating a simple, double-glazed window structure.

To utilize the invention to prevent solar heat energy from entering the interior, it is merely necessary to orient the slats with their non-absorptive surfaces facing the exterior while turning valves 80, 81 to communicate both top and bottom exterior openings 55, 53 to space 14. In this way, very little heat will be generated within space 14 and the minimal amount of heat that is generated will be transferred from the slats to the air within space 14 causing upward circulation therein which draws outside colder air into the bottom exterior openings and forces heated air through the top exterior opening. This prevents the interior space 14 from accumulating an excessive amount of heat which may otherwise radiate into the interior of the dwelling. This mode of operation of the invention is more efficient than prior art solar windows and heat absorptive slats since the cooling effect of interior space 14 decreases the radiant heat energy between the parallel glass panes, thereby decreasing the temperature of the inside glass pane 16.

The present invention offers the additional advantage of providing a multifunction apparatus capable of accomplishing heating and ventilation functions while simultaneously acting as a conventional light shade. For example, any amount of desired light may be allowed to enter the interior of the dwelling by opening slats to any desired extent. While the slats generally are more efficient in terms of heat absorption and reflection when they are oriented generally perpendicular to solar rays, the slats will nevertheless maintain some predetermined heat absorptive and reflection capability at oblique orientations relative to the solar rays. Thus, by opening the slats to any desired position the heating and ventilation functions described above may be accomplished while simultaneously controlling the amount of light entering the interior of the dwelling.

If a user desires to utilize the invention primarily for solar efficiency rather than for light control, the automatic synchronizing apparatus 200 shown in FIG. 13 provides one manner in which to enhance solar efficiency. While apparatus 200 is one type of mechanical device, those skilled in the art will understand that electrical timing apparatus or other mechanical apparatus may be used to perform the same function. Apparatus 200 serves to rotate each of the slats synchronously with the sun in order to maintain the heat absorbing side of each of the slats facing the sun as it moves across the sky. This synchronism is accomplished by synchronizing the rotation of the slats to the earth's daily rotation about its axis.

Apparatus 200 comprises a funnel 202 into which a predetermined amount of some material, for example sand 204, is placed. The sand 204 will fall from spout 206 into container 208 at a predetermined rate which may be easily calculated by those skilled in the art. Container 208 rests upon platform 210 having an angularly extending arm 212 secured thereto. Arm 212 is positioned at angle A relative to platform 210 and is situated adjacent an end of one of the rack rods, for example, rack rod 120 (only partially shown in FIG. 13). Platform 210 is supported upon spring 214 which is in turn secured to a point 216 which is fixed relative to rack rod 120. Downward motion of arm 212 causes it to move rod 120 to the right (with respect to FIG. 13) which motion causes slats secured to rod 120 to rotate approximately about their axes. Proper calibration of sand 204, spout 206, spring 214 and angle A will cause the slat rotation to be synchronized with the earth's rotation, thereby causing the slats to "follow" the sun.

Arm 212 and rod 120 may be physically connected (by means not shown) to enable upward motion of arm 212 to also move rod 120, however, this is not necessary. In the preferred embodiment a user may open frame 22 to gain access to the interior space 14 and manually orient the slats to face the sun, in the morning for example, and pour sand into funnel 202. The frame 22 may then be closed to enable proper operation of window 10. As the sand flows from funnel 202 it will collect in container 208 and the slats will rotate accordingly. When the slats must be reset to face a different position of the sun, the next morning for example, the slats may be manually reset again and accumulated sand 204 may be poured from container 208 into funnel 202 (and retained therein by valve means, not shown, until container 208 may be replaced on platform 210). Synchronous rotation of the slats will thus continue anew.

Those skilled in the art will realize that numerous other modifications and changes may be made to the preferred embodiment of the invention disclosed herein without departing from the spirit and scope thereof.

What is claimed is:

1. A double glazed solar window for use in an exterior wall of a dwelling for selectively heating, insulating and ventilating the interior of said dwelling, said window having two parallel panes of glass separated by a predetermined distance, said parallel panes partially enclosing an intermediate space, comprising:

a quadrangular frame for peripherally holding said panes of glass in a vertical orientation, said frame having:

a. a predetermined depth, height, width and thickness, said height and width dimensions lying in a plane parallel to said wall;

b. an interior peripheral surface facing the interior of said dwelling and an exterior peripheral surface facing the exterior of said dwelling, said interior and exterior surfaces each parallel to said plane and spaced apart by said predetermined depth;

c. an external lateral peripheral surface perpendicular to said plane, said external lateral surface having said predetermined depth, height and width, said external lateral surface extending peripherally about said frame;

d. an internal lateral surface parallel to said external lateral surface, said internal surface situated symmetrically within said external lateral surface and spaced apart therefrom by said predetermined thickness, said internal surface cooperating with said parallel panes to enclose said intermediate space;

e. a plurality of first channels adjacent the bottom of said frame and communicating between said interior of said dwelling and said exterior of said dwelling;

f. a plurality of second channels adjacent the top of said frame and communicating between said interior of said dwelling and said exterior of said dwelling;

g. a plurality of third channels communicating said intermediate space with said first channels;

h. a plurality of fourth channels communicating said inmediate space with said second channels;

a first valve means disposed within said plurality of said first channels for selectively communicating said corresponding third channel to said interior or exterior of said dwelling;

a second valve means disposed within said plurality of said second channels for selectively communicating said corresponding fourth channel to said interior or exterior of said dwelling;

a plurality of rectangular slats oriented in parallel between said panes, each slat extending from one linear side of said internal surface to the opposite linear side of said internal surface, each of said slats having on side thereof predisposed to absorb solar thermal energy wherein each of said slats is provided with a predetermined number of transverse slits therein, each slit of a first predetermined length and width; a plurality of longitudinally extended rectangular strips for being interwoven between said slits in said slats in a predetermined manner to provide for a plurality of decorative patterns, each of said strips having a second predetermined length and width and a predetermined length and width and a predetermined thickness; and framework means for holding said slats and for enabling each of said slats to be rotated generally about their respective axes for selectively substantially facing said one side of said slats toward said interior of said dwelling or toward said exterior of said dwelling.

2. A window according to claim 1 wherein each of said strips is manufactured from material capable of absorbing solar energy.

3. A window according to claim 1 further comprising:

means for automatically substantially synchronously rotating said slats in order to follow the sun by continuously maintaining said slats in a position, relative to the sun, to absorb a maximum amount of energy therefrom at any particular time.

4. A window according to claim 3 wherein said synchronous rotating means comprises:

a funnel for enabling a predetermined material to flow therefrom at a first predetermined rate in response to gravitational forces;

a container for receiving said predetermined material from said funnel;

a platform for supporting said container;

a spring means having a predetermined force constant for supporting said platform;

an arm having a predetermined length extending from said platform at a predetermined angle, said arm for contacting one portion of said framework means;

whereby, upon proper calibration, accumulation of said material in said container will cause said framework means to be rotated at a second predetermined rate equal to the rate of daily axial rotation of the earth.

5. A window according to claim 1 wherein one of said panes of glass is secured within a sash which is, in operation, matably secured to said frame.

6. A window according to claim 4 wherein said sash is hingedly secured to said frame and may be opened to allow access to said intermediate space.

7. A window according to claim 1 wherein said plurality of rectangular slats are vertically oriented in paralles between said panes of glass.

* * * * *